United States Patent [19]

Schwind

[11] 4,402,556
[45] Sep. 6, 1983

[54] ROLLER ASSEMBLY FOR DISHWASHER RACK

[75] Inventor: Richard J. Schwind, Akron, Ohio

[73] Assignee: Phillips Plastics Corporation, Phillips, Wis.

[21] Appl. No.: 376,617

[22] Filed: May 10, 1982

[51] Int. Cl.³ .................. F16C 29/02; A47B 88/00
[52] U.S. Cl. .................. 308/3.6; 384/281; 384/295; 312/341 R
[58] Field of Search .................. 308/3.5, 3 R, 3.6, 3.8, 308/6 R; 211/151, 162; 312/311, 312, 330, 341 R, 350; 384/276, 280, 281, 295, 296, 297

[56] References Cited

U.S. PATENT DOCUMENTS

| 3,469,892 | 9/1969 | Langstroth | 308/3.8 |
| 3,829,191 | 8/1974 | Jenkins | 312/350 X |
| 3,851,943 | 12/1974 | Afful | 312/350 X |

*Primary Examiner*—John M. Jillions
*Assistant Examiner*—David Werner
*Attorney, Agent, or Firm*—James E. Nilles

[57] ABSTRACT

A plurality of roller assemblies are mounted on the side liner walls of the washing compartment of an automatic dishwashing machine to movably support a dishrack which is insertable and withdrawable from the compartment to facilitate loading and unloading. Each roller assembly comprises three rust and corrosion proof plastic components, including a stud, a bushing screwed onto the stud and a roller rotatably mounted on the bushing, and the roller assembly is secured to the liner wall by a metal screw which extends through a hole in the wall and engages the stud. A sealing gasket is disposed around the screw between the stud and the liner wall to prevent liquid in the compartment from reaching the hole and the screw. The stud has a screw-receiving threadable bore which is closed at one end so as to completely encapsulate the screw and prevent liquid from reaching it. The stud has an externally threaded shank which extends into a threaded bore in the bushing which is closed at one end. The bushing has a flared end, to prevent axial removal of the roller.

9 Claims, 13 Drawing Figures

ROLLER ASSEMBLY FOR DISHWASHER RACK

BACKGROUND OF THE INVENTION

1. Field of Use

This invention relates to a roller assembly which is mountable on one component to provide rolling support for another component. In particular, it relates to a roller assembly of the aforesaid character such as is used in the washing compartment of a dishwashing machine to movably support a basket or rack which is insertable and withdrawable from the compartment.

2. Description of the Prior Art

Some domestic appliances, such as automatic dishwashers or the like have a compartment on the inside which receives baskets or racks that hold dishes, glasses and other articles to be washed for storage during the wash cycle. These baskets are insertable and withdrawable from the compartment. To facilitate moving these baskets for convenience during loading and unloading, roller assemblies are provided. Some of these roller assemblies are mounted on the baskets with the rollers rolling on guides or shelves which are mounted on the liner walls of the compartment. In some instances the roller assemblies are mounted on the liner walls of the dishwasher and the basket has guide rails mounted thereon that glide on the rollers. The following U.S. Patents illustrate the state of the art but are by no means exhaustive: Nos. 4,057,872, 3,744,646; 3,261,647. When conventional roller assemblies are mounted on the liner walls of the compartment, certain problems arise that must be overcome. For example, if the roller assemblies are made of metal, they must be made of stainless steel, brass, or any components of the aluminum or other non-ferrous, non-rusting material and materials that will not corrode from the harsh chemicals used as detergents in the wash process. Such materials are relatively costly and therefore undesireable. In addition, when a roller assembly is mounted, it should be sealed so that moisture cannot leak through the liner to attack other parts of the dishwasher. Such sealing requirements can lead to an unduly complex and costly construction and arrangement of components and can result in high labor costs to install, repair or replace.

SUMMARY OF THE PRESENT INVENTION

In accordance with the present invention there is provided an improved roller assembly which is mountable (in conjunction with a plurality of such assemblies) on one component, such as the liner wall of the washing compartment of a dishwashing machine, to provide rolling support for another component, such as a utensile-supporting basket or rack which is insertable and withdrawable from the washing compartment. The roller assembly, which is mountable, for example, on the inside surface of the liner wall comprises three plastic parts and is adapted to be secured to the wall by means of a securing device which is connected thereto and extends through a hole in the wall. Broadly considered, the roller assembly comprises a stud having an externally threaded portion; means on the stud for engagement with the securing device; a nut or bushing having a circular external portion and a threaded bore closed at one end and open at its other end to receive the externally threaded portion of the stud; and a roller having a circular bore to receive the circular portion of the nut or bushing whereby the roller is rotatable on the nut or bushing and provides rolling support for a component such as the basket or rack.

Gasket or sealing means are disposed around the hole, preferably between the stud and the wall. The securing device connected to the stud and extendable through said hole may be a threaded member integral with the stud or, as in the preferred embodiment disclosed herein, take the form of a metal screw which extends through the hole in the wall and threads into a threadable bore in the stud, which bore is closed at one end and open at its other end.

In the preferred embodiment disclosed herein, the roller assembly for mounting on the wall having the hole therethrough for accomodating the screw which secures the roller assembly to the wall comprises the following elements: a stud comprising a threadable bore closed at one end and open at its other end to receive said screw; said stud having an externally threaded portion; a bushing or nut comprising a generally cylindrical portion and a threaded bore closed at one end and open at its other end to receive said externally threaded portion of said stud; and a roller having a cylindrical bore to recieve said cylindrical portion of said bushing or nut whereby said roller is rotatable on said bushing or nut. Means are provided on the bushing and on the roller for rotatably securing said roller on said nut while preventing axial displacement. Gasket or sealing means are disposed between said stud and said wall around said open end of said bore.

The assembly components are made of a special inexpensive plastic suitable for use in dishwashers but is held to the inner liner of the dishwasher with a plated carbon steel screw. A low cost carbon steel screw can be used because it is on the outside of the inner liner and free of moisture contact because of the sealing gasket that is nested in the stud and seals against the inner liner as the screw is torqued tight. The stud is provided with male threads on the external portion that mates with corresponding female threads on the bushing or nut. The bushing or nut is provided with a smooth outer periphery that acts as a bearing surface for the roller.

The assembly is easily serviceable from the inside of the dishwasher. The nut has screw driver slots on its end surface to allow the nut to be tightened during installation or removed should the roller ever require replacement. Removal can be easily accomplished without removing the stud from the liner wall or breaking the seal. The assembly is economical to manufacture, install, service and replace.

Other objects and advantages of the invention will hereinafter appear.

DESCRIPTION OF A PREFERRED EMBODIMENT

Figures 1, 2, 3, 4:
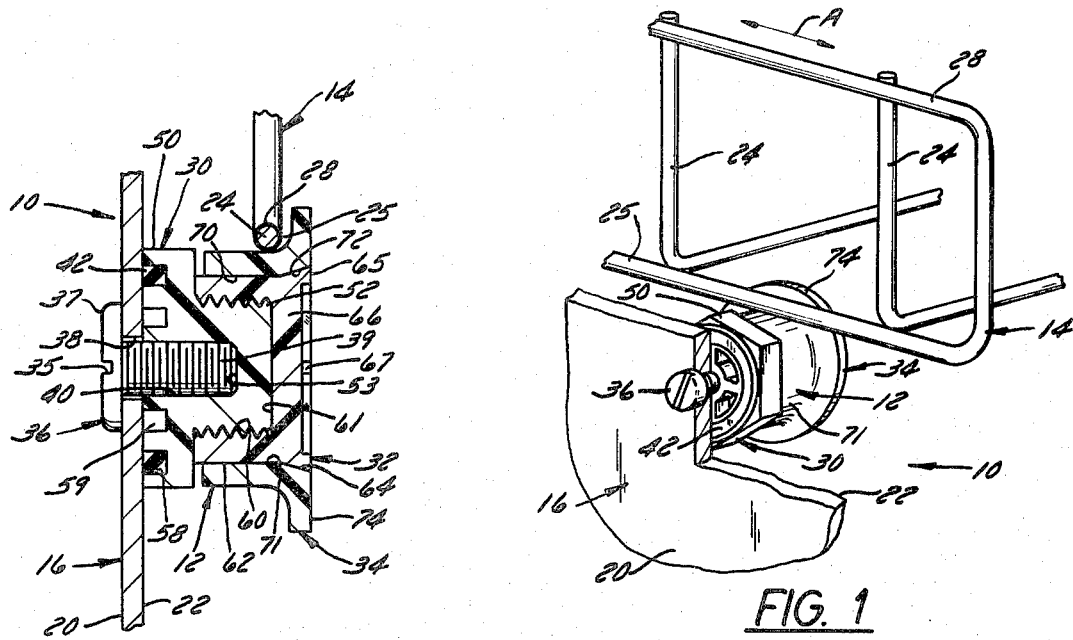
FIG. 1 is a perspective view of a portion of a domestic appliance, such as a dishwashing machine, and shows a portion of the liner wall of the dishwashing compartment, a portion of a dishwashing rack, and a roller assembly in accordance with the invention for movably supporting the rack on the wall.
FIG. 2 is an enlarged cross-sectional view of the roller assembly taken on line 2—2 of FIG. 1.
FIG. 3 is an exploded perspective view of the roller assembly taken in the same direction as the view in FIG. 1.
FIG. 4 is an exploded perspective view of the roller assembly taken in the opposite direction from the view in FIG. 3.
Figure 5:
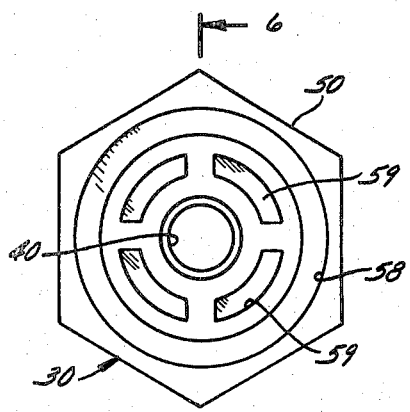
FIG. 5 is a plan view of one end of the stud shown in FIGS. 2, 3 and 4.
Figure 6:
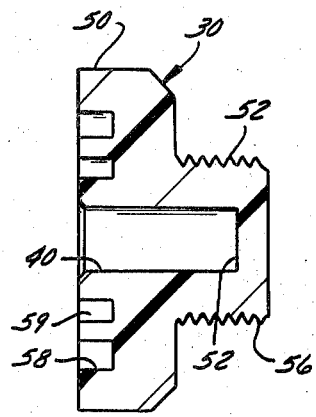
FIG. 6 is a cross-sectional view of the stud taken on line 6—6 of FIG. 5.
Figure 7:
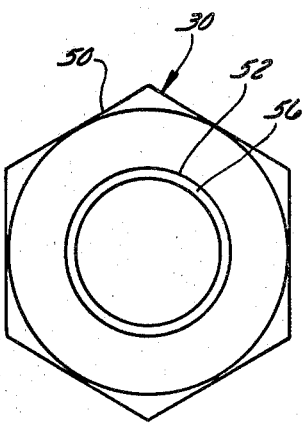
FIG. 7 is a plan view of the other end of the stud shown in FIG. 5.
Figure 8:
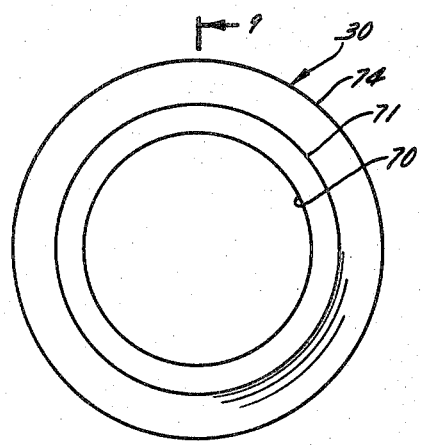
FIG. 8 is a plan view of one end of the roller shown in FIGS. 1 through 4.
Figure 9:
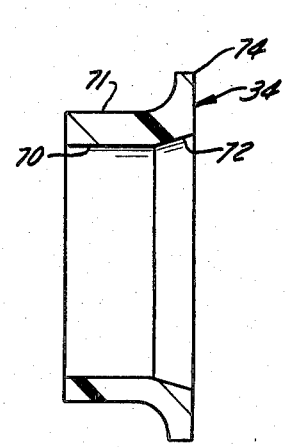
FIG. 9 is a cross-sectional view of the roller taken on line 9—9 of FIG. 8.
Figure 10:
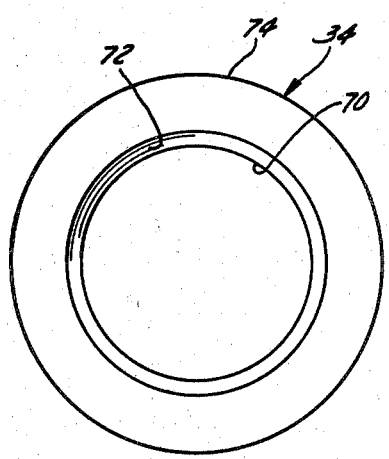
FIG. 10 is a plan view of the opposite end of the roller shown in FIG. 8.
Figure 13:
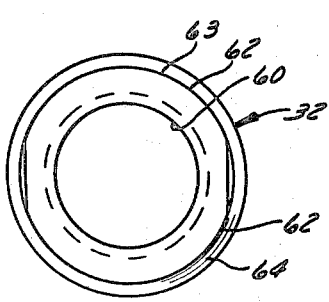
FIG. 13 is a plan view of the other end of the bushing shown in FIG. 11.
Figure 12:
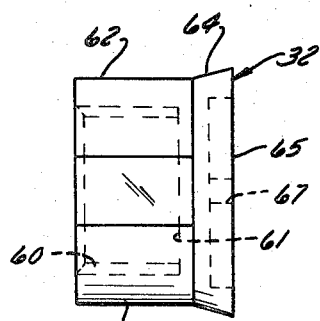
FIG. 12 is a side elevational view of the bushing of FIG. 11.
Figure 11:
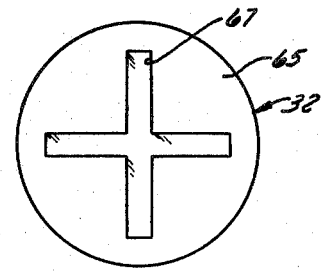
FIG. 11 is a plan view of one end of a threaded bushing shown in FIGS. 2, 3 and 4.

Referring to FIGS. 1 and 2, the numeral 10 generally designates a portion of an automatic dishwashing machine in which a roller assembly 12 in accordance with the invention is advantageously employed, along with a plurality of similar roller assemblies (not shown), to movably support a dishrack or basket 14, only a portion of which is shown, which is insertable into and withdrawable from (in the directions of arrow A) a dishwashing compartment in the machine. Dishwashing machine 10 is understood to comprise a pair of laterally spaced apart side liner walls 16, only one of which is shown, which cooperate with other walls (not shown) and a door (not shown) to define the dishwashing compartment. It is to be understood that when machine 10 is in operation, water and/or a mixture of water and detergent are sprayed about the dishwashing compartment to cleanse dishware (not shown) in dishrack 14. Wall 16 is fabricated, for example, of sheet metal 20 which is coated on its inside surface with a layer 22 of material, such as enamel or glass, to prevent corrosion or rusting of the sheet metal caused by liquids in the compartment. The dishrack 14 is fabricated, for example, of a plurality of spaced apart metal rods 24 which are coated with a layer 28 of material, such as rubber or plastic, to prevent corrosion or rusting of the metal rods caused by liquids in the compartment. Dishrack 14 comprises a pair of lower longitudinally extending rods 25, only one of which is shown, which serve as tracks which rest on the upper side of the roller assemblies such as 12. As dishrack 14 is pulled or pushed relative to machine 10 in the direction of arrow A, the roller assemblies such as 12 facilitate such movement.

The roller assembly 12 comprises three components, such as a stud 30, a bushing 32 and a roller 34, which are fabricated of material, such as plastic, to prevent corrosion or rusting caused by liquids in the compartment. Roller assembly 12 is secured to the inside surface of liner wall 16 by means of a screw 36 which extends through a hole 38 in wall 16 and threads into a threadable bore 40 in stud 30. Screw 36 can be fabricated of low-cost carbon steel, rather than of more expensive plastic or metals which resist rusting and corrosion, because the screw is completely out of contact with liquid inside the washing compartment, as hereinafter explained. Screw 36 comprises a head 37 (with a screw driver slot 35 therein) located on the outside wall 16 and a threaded shank 39 extending through hole 38 and into stud 30. A sealing means or gasket 42, such as a neoprene O-ring, is disposed between the roller assembly 12 and the wall 16 around the hole 38 and prevents liquid flow to screw 36 or to and through the hole 38 from the washing compartment in machine 10.

As FIGS. 2 through 7 show, the stud 30 comprises a flange portion 50 and a shank 52 and has a threadable bore 40, closed at one end by an end wall 53, and extending inwardly from the flange portion for receiving the externally threaded shank 39 of screw 36 extending from the hole 38 in wall 16. The shank 52 of stud 30 has external threads 56 thereon. The flange portion 50 of stud 30 has an annular recess 58 surrounding the open end of threadable bore 40 for receiving the sealing means or gasket 42. To save material, cutouts 59 are formed in flange portion 50. Flange portion 50 has a hexagonal peripheral shape which serves as a tool-engaging means to be held by a tool as the screw 36 is driven into bore 40.

As FIGS. 2 through 4 and 13 show bushing 32 has a threaded bore 60, closed at one end by an end wall 61, for receiving the externally threaded shank 52 of stud 30 whereby the bushing is secured to the stud. The bushing 32 has an external bearing portion 62 comprising a cylindrical portion 63 and an outwardly flaring conical portion 64 at one end. Bushing 32 has an outer end wall 65, separated from wall 61 by a thickness 66, which is provided with a cross-shaped slot 67 which serves as a tool-engaging means to tighten or loosen the bushing on stud 30.

As FIGS. 2 through 4 and 8 through 10 show, roller 34 has a bore 70 comprising a cylindrical portion 71 and an outwardly flaring conical portion 72 for receiving the external bearing portion 62 of bushing 32 whereby the roller is rotatably mounted on the bushing. The conical portion 64 of bushing 32 and the conical portion 72 of the roller 34 inter-engage to prevent axial removal of the roller from the bushing. Roller 34 has an outer flange 74 to engage basket rod 25.

The roller assembly 12 is attached to the wall 16 as follows. First, the screw 16 is inserted through hole 38 and stud 30, with the gasket or seal 42 already in place in recess 38 in stud 30, is screwed onto the screw. Both screw 16 and stud 30 have tool-engaging means thereon (screw drive slot 35 and hexagonal flange 50) to ensure a tight connection. After stud 30 is rigidly secured, roller 34 is placed around shank 50 of the stud and manually held in place thereon while the bushing 32 is screwed onto shank 50. Bushing 32 may be tightened by means of a screw driver (not shown) engaged with the tool-engaging slot 67 therein. Even though bushing 32 is tightened, roller 34 is free to rotate thereon. Roller 34 is not free to move axially off of bushing 32 because of the interengaging conical portions 64 and 72 on the bushing 32 and roller 34, respectively.

In use, the basket rod 25 rides on the upper side of roller 34 and is prevented from slipping off by the flange 74 on the roller.

As is apparent, roller 34 can be replaced if it becomes worn merely by removing the bushing 32 and this can be done solely from within the dishwashing compartment.

As is also apparent, the screw 36 is completely protected from contact with liquid by stud 30 and gasket 42. The bushing 32 is constructed to provide still another layer of protection for the screw, since any frictional wear or collision damage from basket 14 will only affect roller 34 and bushing 32, but not stud 30.

In the embodiment shown, the bore 40 in shank 52 of stud 30 is unthreaded when stud is molded to enable the stud to be released from the molds. However, the threaded shank 39 of metal screw 36 cuts threads in bore 40 as it is screwed thereinto. Such an arrangement also ensures a very tight fit between the stud and screw and prevents vibration of machine 10 when in use from causing the roller assembly 12 from loosening.

I claim:

1. A roller assembly mountable on a component extending from one member to movably support another member comprising:
   a stud having means to enable its attachment to said one member, said means comprising a bore extending into said stud and closed at one end and open at its other end and means engageable with said bore for attaining said stud to said one member, said stud having an externally threaded portion;
   a bushing having an external bearing portion and a threaded bore closed at one end and open at its other end for receiving said externally threaded portion of said stud whereby said bushing is fixedly but removably mounted on said stud;
   and a roller having a bore for receiving said external bearing portion of said bushing whereby said roller is rotatably mounted on said bushing, said bushing including means engageable with said roller to prevent axial removal of said roller from said bushing.

2. A roller assembly according to claim 1 wherein said means engageable with said roller comprises an outwardly extending flange on said bushing.

3. A roller assembly according to claim 1 wherein said bore extending into said stud is threadable and said means engageable with said bore comprises a threaded member extending outwardly from said one member on which said roller assembly is to be mounted.

4. A roller assembly according to claim 1 wherein said stud includes recess means in one end and surrounding the open end of said bore in said stud for receiving sealing means to be disposed between said stud and said one member on which said roller assembly is mountable.

5. A roller assembly mountable on one member to movably support another member comprising:
   a stud comprising a flange portion and a shank and having a screw-receiving bore closed at one end and open at its other end extending inwardly from said flange portion for receiving an externally threaded screw extending from said one member, said shank of said stud having external threads thereon, said flange portion of said stud having an annular recess surrounding the open end of said screw-receiving bore for receiving sealing means;
   a bushing having a threaded bore closed at one end and open at its other end for receiving the externally threaded shank of said stud whereby said bushing is removably secured to said stud, said bushing having an external bearing portion comprising a cylindrical portion and an outwardly flaring conical portion at said one end, said one end being provided with a tool-engaging means;
   and a roller having a bore comprising a cylindrical portion and an outwardly flaring conical portion for receiving said external bearing portion of said bushing whereby said roller is rotatably mounted on said bushing, said conical portions of said bushing and said roller being inter-engaging to prevent axial removal of said roller from said bushing.

6. In combination:
   a member having a screw-receiving hole therethrough;
   a roller assembly disposed on one side of said member, said roller assembly comprising a stud having a screw-receiving bore closed at one end and open at its other end and having external threads, a bushing having a threaded bore closed at one end and open at its other end screwed onto said external threads of said stud but removable therefrom, a roller rotatably mounted on said bushing and means on said bushing and engageable with said roller to prevent axial removal of the latter;
   a screw extending through said hole from the other side of said member and into said screw-receiving bore in said stud whereby said roller assembly is mounted on said member;
   and sealing means disposed between said one side of said member and said stud around said screw.

7. A combination according to claim 6 wherein said screw is metal.

8. A combination according to claim 6 or 7 wherein said stud, said bushing and said roller are plastic.

9. A combination according to claim 8 wherein said stud includes a recess in one end and surrounding the open end of said screw-receiving bore for receiving said sealing means.

* * * * *